US011018370B2

(12) United States Patent
Cheng et al.

(10) Patent No.: US 11,018,370 B2
(45) Date of Patent: May 25, 2021

(54) SEPARATOR WITH WIDE TEMPERATURE RANGE AND LOW SHRINKAGE AS WELL AS METHOD FOR PREPARING THE SAME

(71) Applicant: SHANGHAI ENERGY NEW MATERIALS TECHNOLOGY CO., LTD., Shanghai (CN)

(72) Inventors: Alex Cheng, Shanghai (CN); Lei Xiong, Shanghai (CN); Honggui Deng, Shanghai (CN); Fangbo He, Shanghai (CN); Weiqiang Wang, Shanghai (CN)

(73) Assignee: SHANGHAI ENERGY NEW MATERIALS TECHNOLOGY CO., LTD., Shanghai (CN)

( * ) Notice: Subject to any disclaimer, the term of this patent is extended or adjusted under 35 U.S.C. 154(b) by 84 days.

(21) Appl. No.: 16/095,235

(22) PCT Filed: Apr. 6, 2017

(86) PCT No.: PCT/CN2017/079539
§ 371 (c)(1),
(2) Date: Oct. 19, 2018

(87) PCT Pub. No.: WO2017/181848
PCT Pub. Date: Oct. 26, 2017

(65) Prior Publication Data
US 2019/0088985 A1    Mar. 21, 2019

(30) Foreign Application Priority Data

Apr. 22, 2016 (CN) .......................... 201610256004.5

(51) Int. Cl.
| | | |
|---|---|---|
| *H01M 10/0525* | (2010.01) |
| *H01M 10/0565* | (2010.01) |
| *H01G 9/02* | (2006.01) |
| *H01M 2/16* | (2006.01) |
| *C08L 61/16* | (2006.01) |
| *B29D 7/01* | (2006.01) |
| *C08J 9/28* | (2006.01) |
| *C08L 27/16* | (2006.01) |
| *C08L 23/06* | (2006.01) |
| *H01M 50/40* | (2021.01) |
| *H01M 50/409* | (2021.01) |
| *H01M 50/449* | (2021.01) |

(52) U.S. Cl.
CPC .......... *H01M 10/0525* (2013.01); *B29D 7/01* (2013.01); *C08J 9/28* (2013.01); *C08L 23/06* (2013.01); *C08L 27/16* (2013.01); *C08L 61/16* (2013.01); *H01G 9/02* (2013.01); *H01M 10/0565* (2013.01); *H01M 50/40* (2021.01); *H01M 50/409* (2021.01); *H01M 50/449* (2021.01)

(58) Field of Classification Search
CPC ......... H01M 10/0525; H01M 10/0565; H01M 2/14; H01M 2/145; H01M 2/16; H01M 2/1653; H01M 2/1686
See application file for complete search history.

(56) References Cited

U.S. PATENT DOCUMENTS

| | | | |
|---|---|---|---|
| 2009/0098450 A1 | 4/2009 | Kikuchi et al. |
| 2009/0269672 A1 | 10/2009 | Takita et al. |
| 2012/0237832 A1* | 9/2012 | Nakagiri ................. | H01M 2/16 429/246 |
| 2014/0030606 A1* | 1/2014 | Kojima ................. | H01M 2/145 429/246 |
| 2014/0120403 A1 | 5/2014 | Lin et al. |

FOREIGN PATENT DOCUMENTS

| | | |
|---|---|---|
| CN | 101272907 | 9/2008 |
| CN | 101/296795 | 10/2008 |
| CN | 102208588 | 10/2011 |
| CN | 102820444 | 12/2012 |
| CN | 103421208 | 12/2013 |
| CN | 105237856 | 1/2016 |
| EP | 2894694 | 7/2015 |
| EP | 2897197 | 7/2015 |
| JP | 2015013913 | 1/2015 |
| WO | 2010/108148 | 9/2010 |
| WO | 2015046357 | 4/2015 |

OTHER PUBLICATIONS

Practical Guide to Polyethylene; Vasile, Cornelia; Pascu, Mihaela; Rapra Technology Limited; 2005 (Year: 2005).*

* cited by examiner

*Primary Examiner* — Sarah A. Slifka
*Assistant Examiner* — Rachel L Zhang
(74) *Attorney, Agent, or Firm* — Robin L. Teskin; Baker, Donelson, Bearman, Caldwell & Berkowitz PC

(57) ABSTRACT

The invention discloses a separator with a wide temperature range and a low heat shrinkage and a method for preparing the same. The invention belongs to the field of electrochemistry. The separator of the invention includes: an irradiation crosslinked fluoropolymer A with a melting point above 150° C. and/or a polymer B containing a benzene ring in its main chain; an ultrahigh molecular weight polyethylene having a molecular weight of $1.0 \times 10^6$-$10.0 \times 10^6$, and a high density polyethylene having a density in the range of 0.940-0.976 g/cm$^3$; the temperature difference between pore closing temperature and film breaking temperature of the separator is 80-90° C., preferably 85-90° C., the heat shrinkage of the separator is 2.0% or less. The separator of the invention has a high temperature difference between film breaking temperature and pore closing temperature, and a low heat shrinkage; when the separator of the invention is used in an electrochemical device, the reliability and safety of electrochemical device can be effectively improved.

11 Claims, No Drawings

SEPARATOR WITH WIDE TEMPERATURE RANGE AND LOW SHRINKAGE AS WELL AS METHOD FOR PREPARING THE SAME

TECHNICAL FIELD

The invention relates to the field of electrochemistry, particularly to a separator for electrochemical device and a method for preparing the same.

BACKGROUND ART

Lithium ion batteries are usually composed of a positive electrode, a negative electrode, a separator, electrolyte solution, and a battery case. In the structure of lithium ion batteries, the separator is one of the key inner elements. The main functions of the separator are to separate the positive and the negative electrodes of the battery so as to prevent a direct contact and thus short circuit between the positive and the negative electrodes, and to enable electrolyte ions to pass smoothly during the charging and discharging process of the battery to form a current; moreover, when the operation temperature of the battery rises abnormally, the separator can close the migration channel of electrolyte ions, and cut off the current to ensure the safety of the battery.

Normally, during the assembly of a battery, a separator completely separates the positive and negative electrodes of the battery. However, a polymer separator undergoes some heat shrinkage in the subsequent battery baking process. In addition, the internal temperature rising caused by large charge and discharge current during actual use of the battery may also cause some heat shrinkage of the polymer separator. In order to avoid internal short circuit caused by direct contact between the positive and negative electrodes due to heat shrinkage, it is required that the heat Shrinkage of the separator is as small as possible. Under abnormal conditions, e.g., when a short circuit occurs in external circuit, the internal temperature of the battery rises sharply due to excessive current, which requires the separator to close the migration path of the conductive ions in time. Therefore, the temperature at which the micropores of the battery separator are melted and closed is referred to as pore closing temperature. When the temperature continues to rise, the separator is fused and broken; thus the fusing and breaking temperature is called film breaking temperature. From the viewpoint of the safety of lithium ion batteries, there must be a certain temperature difference between the pore closing temperature and the film breaking temperature of the separator to ensure that even if the temperature continues to rise after the separator undergoes pore closing to cut off the current, there is enough temperature buffer to prevent the separator from breaking.

In order to improve the use safety of lithium ion battery separator, the most common method is to apply a ceramic slurry coating on a polymer separator. Although the coating process can significantly improve the heat resistance of the polymer separator and reduce heat shrinkage, the substrate of separator itself is still a conventional polymer, especially in a temperature environment above the melting point, the conventional polymer has almost no strength at all, and thus is very susceptible to be damaged. Additionally, for the coating process, there is a high requirement on the ceramic slurry, and the ceramic slurry particles may fall off during the use of batteries, causing local heat shrinkage of the separator and thus affect overall performance.

Therefore, there is a need in the art to provide a separator for electrochemical devices, the separator has a wide temperature difference between pore closing temperature and film breaking temperature, and has a low heat shrinkage.

SUMMARY OF THE INVENTION

The present invention is directed to a separator for electrochemical device having a wide temperature range and a low shrinkage.

In a first aspect, the invention provides a separator for electrochemical device, comprising: an irradiation cross-linked fluoropolymer A with a melting point above 150° C. and/or a polymer B containing a benzene ring in its main chain; an ultrahigh molecular weight polyethylene having a molecular weight of $1.0 \times 10^6$-$10.0 \times 10^6$; and a high density polyethylene having a density in the range of 0.940-0.976 g/cm$^3$;

the separator for electrochemical device has a temperature difference between pore closing temperature and film breaking temperature of 80-90° C., and a heat Shrinkage of 2.0% or less;

the fluoropolymer A with a melting point above 150° C. is selected from the group consisting of polytetrafluoroethylene, polyvinyl fluoride, polyvinylidene fluoride, ethylene-tetrafluoroethylene copolymer, propylene-tetrafluoroethylene copolymer, fluorinated ethylene-propylene copolymer, vinylidene fluoride-hexafluoropropylene copolymer and vinylidene fluoride-tetrafluoroethylene-hexafluoropropylene terpolymer; and the polymer B having a benzene ring in its main chain is selected from the group consisting of: poly(paraphenylene terephthalamide), polyaryl ether sulfone, polyaryl sulfone, polyether sulfone, polyarylene sulfide sulfone, polyether ether ketone, polyether ketone, polyether ketone ketone, polyether ether ketone ketone, polyether ketone ether ketone ketone, polyphenylene ether, polyphenylene sulfide, polyaryl ester, polyphenyl ester, semi-aromatic or aromatic polyimides, semi-aromatic or aromatic polyamides, polyetherimides and polyamideimides.

In another preferred embodiment, the polymer B having a benzene ring in its main chain may contain pendant vinyl or ethynyl groups.

In a preferred embodiment, the content of the fluoropolymer A is 1-50 parts by weight, based on 100 parts of the total weight of the ultrahigh molecular weight polyethylene and the high density polyethylene.

In a preferred embodiment, the content of the polymer B is 1-50 parts by weight, based on 100 parts of the total weight of the ultrahigh molecular weight polyethylene and the high density polyethylene.

In another preferred embodiment, the weight ratio of the ultrahigh molecular weight polyethylene to the high density polyethylene is 1:1-1:20, more preferably 1:2-1:10, most preferably 1:5-1:10.

In another preferred embodiment, the ultrahigh molecular weight polyethylene has a molecular weight of $2.0 \times 10^6$-$8.0 \times 10^6$, more preferably $3.5 \times 10^6$-$5.0 \times 10^6$; and the high density polyethylene has a density of 0.940-0.960 g/cm$^3$, more preferably 0.950-0.960 g/cm$^3$.

In a second aspect, the invention provides a method for preparing a separator according to present invention, the method comprising the steps of:

(1) mixing a fluoropolymer A with a melting point of above 150° C. and/or a polymer B having a benzene ring in its main chain, an ultrahigh molecular weight polyethylene having a molecular weight of $1.0 \times 10^6$-

$10.0 \times 10^6$, a high density polyethylene having a density of 0.940-0.976 g/cm³, an antioxidant, a crosslinking agent and a pore-forming agent to form a mixture;

wherein the fluoropolymer A with a melting point above 150° C. is selected from the group consisting of polytetrafluoroethylene, polyvinyl fluoride, polyvinylidene fluoride, ethylene-tetrafluoroethylene copolymer, propylene-tetrafluoroethylene copolymer, fluorinated ethylene-propylene copolymer, vinylidene fluoride-hexafluoropropylene copolymer and vinylidene fluoride-tetrafluoroethylene-hexafluoropropylene terpolymer;

the polymer B having a benzene ring in its main chain is selected from the group consisting of: poly(paraphenylene terephthalamide), polyaryl ether sulfone, polyaryl sulfone, polyether sulfone, polyarylene sulfide sulfone, polyether ether ketone, polyether ketone, polyether ketone ketone, polyether ether ketone ketone, polyether ketone ether ketone ketone, polyphenylene ether, polyphenylene sulfide, polyaryl ester, polyphenyl ester, semi-aromatic or aromatic polyimides, semi-aromatic or aromatic polyamides, polyetherim ides and polyamideimides;

(2) extruding the mixture into a strip by an extruder;
(3) extracting the strip with an organic solvent;
(4) stretching the extracted strip into a film by a stretching machine; and
(5) irradiation crosslinking the film to obtain a separator for electrochemical device according to present invention.

In a preferred embodiment, the content of the fluoropolymer A is 1-50 parts by weight, more preferably from 5-40 parts by weight, most preferably 10-30 parts by weight, based on 100 parts of the total weight of the ultrahigh molecular weight polyethylene and the high density polyethylene;

In another preferred embodiment, the content of the polymer B is 1-50 parts by weight, more preferably 5-40 parts by weight, most preferably 10-30 parts by weight, based on 100 parts of the total weight of the ultrahigh molecular weight polyethylene and the high density polyethylene.

In another preferred embodiment, the weight ratio of the ultrahigh molecular weight polyethylene to the high density polyethylene is 1:1-1:20; more preferably 1:2-1:10; most preferably 1:5-1:10.

In another preferred embodiment, the ultrahigh molecular weight polyethylene has a molecular weight of $2.0 \times 10^6$-$8.0 \times 10^6$, more preferably $3.5 \times 10^6$-$5.0 \times 10^6$; and the high density polyethylene has a density of 0.940-0.960 g/cm³, more preferably 0.950-0.960 g/cm³.

In another preferred embodiment, the organic solvent used for the extraction is selected from dichloromethane, n-hexane, ethyl acetate or acetone.

In another preferred embodiment, the irradiation crosslinking is selected from the group consisting of high-energy gamma ray irradiation crosslinking, electron beam irradiation crosslinking or photo-initiated crosslinking; preferably electron beam irradiation crosslinking.

In another preferred embodiment, the antioxidant may be one or more selected from the group consisting of 4,4-thiobis(6-tert-butyl-m-cresol), dibutylhydroxytoluene, phosphite, tert-butylhydroquinone, n-octadecyl β-(3,5-di-tert-butyl-4-hydroxyphenyl)-propionate, 1,1,3-tris(2-methyl-4-hydroxy-5-tert-butylphenyl) butane, 2-tert-butyl-6-methylphenol, N,N'-bis(β-naphthyl)-p-phenylenediamine, dilauryl thiodipropionate, tris(nonylphenyl) phosphite, and triphenyl phosphite.

In another preferred embodiment, the crosslinking agent may be one or more selected from the group consisting of mercaptobenzothiazole, benzothiazolyl disulfide, N-cyclohexylbenzothiazole sulfenamide, oxydivinylbenzothiazole sulfenamide, tetramethylthiuram monosulfide, tetramethylthiuram disulfide, zinc dimethyldithiocarbamate, zinc diethyldithiocarbamate, diphenylguanidine, di-o-tolylguanidine, ethylenethiourea, N,N'-diethyl thiourea, hexamethylenetetramine, zinc isopropyl xanthate, trimethylolpropane trimethacrylate, trimethylolpropane triacrylate, triallyl cyanurate, and triallyl isocyanurate.

In another preferred embodiment, the pore-forming agent may be one or more selected from the group consisting of natural mineral oils, $C_{6-15}$ alkanes, $C_{8-15}$ aliphatic carboxylic acids, $C_{1-4}$ alkyl $C_{8-15}$ aliphatic carboxylic ester, and $C_{2-6}$ halogenated alkanes.

In a third aspect, the invention provides an electrochemical device comprising a positive electrode, a negative electrode, a separator between the positive electrode and the negative electrode, and an electrolyte, the separator is a separator according to present invention.

Therefore, the present invention provides a separator for electrochemical device, the separator has a wide temperature difference between pore closing temperature and film breaking temperature, and has a low heat Shrinkage.

Embodiments

As used herein, "electrochemical device" includes a lithium secondary battery, a lithium ion secondary battery, a supercapacitor, a fuel cell, a solar cell, and the like; the lithium ion secondary battery includes a polymer lithium ion secondary battery.

In present invention, unless specified otherwise, the numerical range "a-b" means an abbreviated representation of any real numbers combination between a and b, where a and b are both real numbers. For example, a numerical range of "0-5" means that all real numbers between "0-5" have been listed herein, and "0-5" is only an abbreviated representation of these numerical combinations.

In present invention, unless specified otherwise, the integer numerical range "a-b" means an abbreviated representation of any integer combination between a and b, where both a and b are integers. For example, the integer numerical range "1-N" means 1, 2 . . . N, where N is an integer.

Unless otherwise specified, the term "a" as used in the specification means "at least one". The "range" disclosed herein is in the form of a lower limit and an upper limit. It may be one or more lower limits, and one or more upper limits, respectively. A given range is defined by selecting a lower limit and an upper limit. The selected lower and upper limits define the boundaries of a particular range. All the ranges that can be defined in this manner are inclusive and combinable, that is, any lower limit can be combined with any upper limit to form a range. For example, ranges of 60-120 and 80-110 are listed for specific parameters, which is understood that ranges of 60-110 and 80-120 are also contemplated. In addition, if the minimum range values 1 and 2 are listed, and if the maximum range values 3, 4 and 5 are listed, the following ranges are all contemplated: 1-3, 1-4, 1-5, 2-3, 2-4, and 2-5.

In present invention, the "molecular weight" mentioned herein means a weight average molecular weight, unless otherwise specified.

After extensive and intensive researches, the inventors have found that a battery separator with a wide temperature range and a low shrinkage can be obtained by adding a fluoropolymer A with a melting point of above 150° C. and/or a polymer B containing benzene ring in its main chain, in addition to components required by conventional separators, and by irradiation crosslinking. The separator has a significantly improved temperature difference between film breaking temperature and pore closing temperature, and has a very low heat Shrinkage; thus the reliability and safety of batteries are greatly improved. On such basis, the invention has been completed.

Separator

The separator for electrochemical device according to present invention is a battery separator with a wide temperature range and a low shrinkage. The separator has a temperature difference between pore closing temperature and film breaking temperature of 80-90° C., preferably 85-90° C.; the heat Shrinkage is 2.0% or less, an may be as low as 0.5%.

The raw materials for preparing a separator for electrochemical device according to present invention may include:
(a) a mixture of ultrahigh molecular weight polyethylene having a molecular weight of $1.0 \times 10^6$-$10.0 \times 10^6$ and high density polyethylene having a density in the range of 0.940-0.976 g/cm³, where the weight ratio of the ultrahigh molecular weight polyethylene to the high density polyethylene is 1:1-1:20;
(b) 1-50 parts by weight of fluoropolymer A with a melting point of above 150° C., based on 100 parts by weight of the total weight of the ultrahigh molecular weight polyethylene and the high density polyethylene; the fluoropolymer A with a melting point of above 150° C. may be one or more selected from the group consisting of polytetrafluoroethylene, polyvinyl fluoride, polyvinylidene fluoride, ethylene-tetrafluoroethylene copolymer, propylene-tetrafluoroethylene copolymer, fluorinated ethylene-propylene copolymer, vinylidene fluoride-hexafluoropropylene copolymer and vinylidene fluoride-tetrafluoroethylene-hexafluoropropylene terpolymer;
(c) 1-50 parts by weight of polymer B containing benzene ring in its main chain, based on 100 parts by weight of the total weight of the ultrahigh molecular weight polyethylene and the high density polyethylene; the polymer B having a benzene ring in its main chain may be one or more selected from the group consisting of poly(paraphenylene terephthalamide), polyaryl ether sulfone, polyaryl sulfone, polyether sulfone, polyarylene sulfide sulfone, polyether ether ketone, polyether ketone, polyether ketone ketone, polyether ether ketone ketone, polyether ketone ether ketone ketone, polyphenylene ether, polyphenylene sulfide, polyaryl ester, polyphenyl ester, semi-aromatic or aromatic polyimides, semi-aromatic or aromatic polyamides, polyetherimides and polyamideimides;
(d) 500-2000 parts by weight of a pore-forming agent, based on 100 parts of the total weight of the ultrahigh molecular weight polyethylene and high density polyethylene;
(e) 0.5-20 parts by weight of an antioxidant, based on 100 parts of the total weight of the ultrahigh molecular weight polyethylene and the high density polyethylene; and
(f) 0.1-10 parts by weight of a crosslinking agent, based on 100 parts of the total weight of the ultrahigh molecular weight polyethylene and the high density polyethylene.

In an embodiment of the invention, the ultrahigh molecular weight polyethylene has a molecular weight of $2.0 \times 10^6$-$8.0 \times 10^6$, preferably $3.5 \times 10^6$-$5.0 \times 10^6$.

In an embodiment of the invention, the high density polyethylene has a density of 0.940-0.960 g/cm³, preferably 0.950-0.960 g/cm³.

In an embodiment of the invention, the weight ratio of the ultrahigh molecular weight polyethylene to the high density polyethylene is 1:2-1:10, preferably 1:5-1:10.

In an embodiment of the invention, the content of fluoropolymer A with a melting point of above 150° C. is 5-40 parts by weight, preferably 10-30 parts by weight, based on 100 parts of the total weight of the ultrahigh molecular weight polyethylene and the high density polyethylene.

In an embodiment of the invention, the content of the polymer B having a benzene ring in its main chain is 5-40 parts by weight, preferably 10-30 parts by weight, based on 100 parts of the total weight of the ultrahigh molecular weight polyethylene and the high density polyethylene.

In an embodiment of the invention, the polymer B having a benzene ring in its main chain may have a pendant vinyl or ethynyl group.

In an embodiment of the invention, the pore-forming agent may be one or more selected from the group consisting of natural mineral oils, $C_{6-15}$ alkanes, $C_{8-15}$ aliphatic carboxylic acids, $C_{1-4}$ alkyl $C_{8-15}$ aliphatic carboxylic ester, and $C_{2-6}$ halogenated alkanes; the content of the pore-forming agent is 700-1800 parts by weight, preferably 800-1600 parts by weight, based on 100 parts of the total weight of the ultrahigh molecular weight polyethylene and the high density polyethylene.

In an embodiment of the invention, the antioxidant may be one or more selected from the group consisting of 4,4-thiobis(6-tert-butyl-m-cresol), dibutylhydroxytoluene, phosphite, tert-butylhydroquinone, n-octadecyl β-(3,5-di-tert-butyl-4-hydroxyphenyl)-propionate, 1,1,3-tris(2-methyl-4-hydroxy-5-tert-butylphenyl) butane, 2-tert-butyl-6-methylphenol, N,N'-bis(β-naphthyl)-p-phenylenediamine, dilauryl thiodipropionate, tris(nonylphenyl) phosphite, and triphenyl phosphite; the content of the antioxidant is 1.5-16 parts by weight, preferably 2-12 parts by weight, based on 100 parts of the total weight of the ultrahigh molecular weight polyethylene and the high density polyethylene.

In an embodiment of the invention, the crosslinking agent may be one or more selected from the group consisting of mercaptobenzothiazole, benzothiazolyl disulfide, N-cyclohexylbenzothiazole sulfenamide, oxydivinylbenzothiazole sulfenamide, tetramethylthiuram monosulfide, tetramethylthiuram disulfide, zinc dimethyldithiocarbamate, zinc diethyldithiocarbamate, diphenylguanidine, di-o-tolylguanidine, ethylenethiourea, N,N'-diethyl thiourea, hexamethylenetetramine, zinc isopropyl xanthate, trimethylolpropane trimethacrylate, trimethylolpropane triacrylate, triallyl cyanurate, and triallyl isocyanurate; the content of the crosslinking agent is 0.5-5 parts by weight, preferably 0.5-3 parts by weight, based on 100 parts of the total weight of the ultrahigh molecular weight polyethylene and the high density polyethylene.

Preparation Method of the Separator

The preparation method of the separator for electrochemical device according to present invention comprises the following steps:
step 1, mixing the raw materials according to a formulation to form a mixture;
step 2, extruding the mixture into a strip by an extruder;
step 3, extracting the strip with an organic solvent;

step 4: stretching the extracted strip into a film by a stretching machine;

step 5, irradiation crosslinking the film to obtain a separator for electrochemical device according to present invention.

In above step 1, the weight ratio of the ultrahigh molecular weight polyethylene to the high density polyethylene is 1:1-1:20, preferably 1:2-1:10, most preferably 1:5-1:10.

In above step 1, the content of fluoropolymer A with a melting point of above 150° C. is 1-50 parts by weight, preferably 5-40 parts by weight, most preferably 10-30 parts by weight, based on 100 parts of the total weight of the ultrahigh molecular weight polyethylene and the high density polyethylene.

In above step 1, the content of the polymer B having a benzene ring in its main chain is 1-50 parts by weight, preferably 5-40 parts by weight, most preferably 10-30 parts by weight, based on 100 parts of the total weight of the ultrahigh molecular weight polyethylene and the high density polyethylene.

In above step 1, the content of the pore-forming agent is 500-2000 parts by weight, preferably 700-1800 parts by weight, most preferably 800-1600 parts by weight, based on 100 parts of the total weight of the ultrahigh molecular weight polyethylene and the high density polyethylene.

In above step 1, the content of the antioxidant is 0.5-20 parts by weight, preferably 1.5-16 parts by weight, most preferably 2-12 parts by weight, based on 100 parts of the total weight of the ultrahigh molecular weight polyethylene and the high density polyethylene.

In above step 1, the content of the crosslinking agent is 0.1-10 parts by weight, preferably 0.5-5 parts by weight, most preferably 0.5-3 parts by weight, based on 100 parts of the total weight of the ultrahigh molecular weight polyethylene and the high density polyethylene.

In above step 1, the mixing can be carried out by conventional processes in the art, for example, but not limited to, stirring, ball milling, ultrasonic dispersion, and so on.

In above step 2, in an embodiment of the invention, the mixture is fed to a twin-screw extruder to allow the ultrahigh molecular weight polyethylene, high density polyethylene, fluoropolymer A with a melting point of above 150° C., polymer B having a benzene ring in its main chain, an antioxidant and a crosslinking agent to be subsequently dissolved in the pore-forming agent in the twin-screw extruder at above 150° C. (preferably 170-180° C.), and then continuously extruded by the twin-screw extruder to obtain a strip.

In the step 3, the extraction is used to remove the pore-forming agent in the strip; the organic solvent for extraction is selected from dichloromethane, n-hexane, ethyl acetate, acetone.

In above step 4, the extracted strip is continuously stretched into a film in a bidirectional stretching machine; in a preferred embodiment, the film is subjected to a secondary extraction, and this extraction is performed with an organic solvent which is generally the same as used in the previous extraction.

In an embodiment of the invention, the film is heat set and rolled before the step 5.

In above step 5, the irradiation crosslinking is selected from high-energy gamma ray irradiation crosslinking, high-energy electron beam irradiation crosslinking or photo-initiated crosslinking; preferably high-energy electron beam irradiation crosslinking. The irradiation dose ranges from 10 to 500 kGy, preferably from 50 to 300 kGy, most preferably from 80 to 150 kGy.

Application of the Separator

The separator according to present invention can be used in an electrochemical device and its preparation. The electrochemical device includes a positive electrode, a negative electrode, a separator of the invention between the positive electrode and the negative electrode, and an electrolyte.

The features mentioned above in present invention or the features mentioned in the examples may be used in any combination. All the features described in the specification can be used in combination with any form of composition, and the various features described in the specification can be substituted by any alternative features that provide the same, equal or similar purpose. Therefore, unless otherwise specified, the described features are only general examples of equivalent or similar features.

The Main Advantages of Present Invention

The separator according to present invention has a high temperature difference between film breaking temperature and pore closing temperature, and a low heat Shrinkage. When the separator of the invention is used in an electrochemical device, the reliability and safety of the electrochemical device can be significantly improved.

The invention will be further illustrated below in combination with specific examples. It is to be understood that these examples are used only for illustrating the invention but not intended to limit the scope of the invention. The experimental methods in the following examples which do not specify the specific conditions are usually carried out under conventional conditions or the conditions recommended by the manufacturers. All percentages, ratios, proportions, or parts are based on weight, unless otherwise specified.

The unit of percent weight in volume in present invention is well known to those skilled in the art and, for example, refers to the weight of the solute in a 100 ml solution.

Unless otherwise defined, all the professional and scientific terms used herein have the same meanings as used in the art. In addition, any methods and materials that are similar or equivalent to those described may be employed in the methods of the invention. The preferred embodiments and materials described herein are for illustrative purposes only.

The experimental methods involved in the following examples include:

1. Measurement of Shrinkage

The distance $L_0$ between two points on the separator sample was measured under normal temperature (23° C.) test environment, then the separator sample was placed on a stainless steel frame in an oven at 120° C.±1° C., held for 1 hour and then taken out. When the separator sample was cooled to normal temperature test environment, the distance $L_1$ between the two points on the separator sample was measured, and the Shrinkage S was calculated according to the formula: $S=(L_0-L_1)/L_0\times 100\%$.

2. Measurement of Pore Closing Temperature

The separator sample was fixed on a stainless steel frame and placed in an oven that had been heated to a preset temperature for 2 minutes, and then taken out and cooled, and its air permeability was measured by the method mentioned above. The temperature at which the air permeability was decreased by 5% was taken as pore closing temperature.

3. Measurement of Film Breaking Temperature

The separator sample was fixed on a stainless steel frame and placed in an oven that had been heated to a preset temperature for 2 minutes, and then taken out, and its subsequent deformation (e.g., shrinkage) was observed. The highest temperature at which the deformation occurred was taken as film breaking temperature.

4. Measurement of High Temperature Strength

The test was performed at 180° C. using Zhiqin DE-HU-20 high temperature tensile tester according to ASTM d882-2002 standard tensile test method for plastic sheet.

EXAMPLE 1

220 g of high density polyethylene having a density of 0.956 g/cm$^3$, 100 g of ultrahigh molecular weight polyethylene having a molecular weight of 5.0×10$^6$, and 96 g of polyvinylidene fluoride having a molecular weight of 5.0×10$^6$ (with a melting point of above 150° C.), 6.4 g of n-octadecyl β-(3,5-di-tert-butyl-4-hydroxyphenyl)-propionate (antioxidant), 3.2 g of triallyl isocyanurate (crosslinking agent), and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, high density polyethylene, polyvinylidene fluoride, an antioxidant and a crosslinking agent were continuously dissolved in mineral oil in the twin-screw extruder at 180° C., and continuously extruded by the twin-screw extruder at a speed of 200 rpm, the mixture continuously entered into a slit die, and was extruded through the slit die to a casting cooling roller, and cast into a strip at 80° C.

The obtained strip was placed in an extraction tank containing dichloromethane for extraction to remove mineral oil from the strip. The extracted strip was continuously fed into a biaxial stretching machine at 120° C. to be stretched into a film, then the resulting film material was subjected to a secondary extraction with dichloromethane, and the resulting film was washed with deionized water, heat set at 120° C. for 15 minutes, and wound at a speed of 20 m/min to obtain a non-irradiation-crosslinked battery separator. The resulting separator was irradiated with an electron beam having a total dose of 100 kGy to finally obtain the separator with a wide temperature range and low shrinkage, and its specific performance parameters were tested as shown in Table 1:

TABLE 1

| Performance | Irradiation dose 100 kGy |
|---|---|
| Shrinkage (120° C.) | longitudinal: 1.9% transverse: 0.9% |
| pore closing temperature | 120° C. |
| film breaking temperature | 205° C. |
| High temperature strength (180° C.) | longitudinal: 16.1 MPa transverse: 12.1 MPa |

EXAMPLE 2

220 g of high density polyethylene having a density of 0.956 g/cm$^3$, 100 g of ultrahigh molecular weight polyethylene having a molecular weight of 5.0×10$^6$, and 96 g of polyether ether ketone (the main chain contains a benzene ring and a pendant vinyl group) having a melt index of 2.8-4.6 g/10 min, 6.4 g of n-octadecyl β-(3,5-di-tert-butyl-4-hydroxyphenyl)-propionate (antioxidant), 3.2 g of triallyl isocyanurate (crosslinking agent), and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, high density polyethylene, polyether ether ketone, an antioxidant and a crosslinking agent were continuously dissolved in mineral oil in the twin-screw extruder at 180° C., and continuously extruded by a twin-screw extruder at a speed of 200 rpm, the mixture continuously entered into a slit die, and was extruded through the slit die to a casting cooling roller, and cast into a strip at 80° C.

The obtained strip was placed in an extraction tank containing dichloromethane for extraction to remove mineral oil from the strip. The extracted strip was continuously fed into a biaxial stretching machine at 120° C. to be stretched into a film, then the resulting film material was subjected to a secondary extraction with dichloromethane, and the resulting film was washed with deionized water, heat set at 120° C. for 15 minutes, and wound at a speed of 20 m/min to obtain a non-irradiation-crosslinked battery separator. The resulting separator was irradiated with an electron beam having a total dose of 100 kGy to finally obtain the separator with a wide temperature range and a low shrinkage, and its specific performance parameters were tested as shown in Table 2:

TABLE 2

| Performance | Irradiation dose 100 kGy |
|---|---|
| Shrinkage (120° C.) | longitudinal: 1.1% transverse: 0.8% |
| pore closing temperature | 120° C. |
| film breaking temperature | 205° C. |
| High temperature strength (180° C.) | longitudinal: 17.2 MPa transverse: 15.6 MPa |

EXAMPLE 3

220 g of high density polyethylene having a density of 0.956 g/cm$^3$, 100 g of ultrahigh molecular weight polyethylene having a molecular weight of 5.0×10$^6$, and 96 g of polyvinylidene fluoride having a molecular weight of 5.0×10$^5$ (melting point above 150° C.), 96 g of polyether ether ketone (the main chain containing a benzene ring and pendant vinyl group) having a melt index of 2.8-4.6 g/10 min, 6.4 g of n-octadecyl β-(3,5-di-tert-butyl-4-hydroxyphenyl)-propionate (antioxidant), 3.2 g of triallyl isocyanurate (crosslinking agent), and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, high density polyethylene, polyvinylidene fluoride, polyether ether ketone, an antioxidant and a crosslinking agent were continuously dissolved in mineral oil in the twin-screw extruder at 180° C., and continuously extruded by a twin-screw extruder at a speed of 200 rpm, the mixture continuously entered into a slit die, and was extruded through the slit die to a casting cooling roller, and cast into a strip at 80° C.

The obtained strip was placed in an extraction tank containing dichloromethane for extraction to remove mineral oil from the strip. The extracted strip was continuously fed into a biaxial stretching machine at 120° C. to be stretched into a film, then the resulting film material was subjected to a secondary extraction with dichloromethane, and the resulting film was washed with deionized water, heat set at 120° C. for 15 minutes, and wound at a speed of 20 m/min to obtain a non-irradiation-crosslinked battery separator. The resulting separator was irradiated with an electron beam having a total dose of 100 kGy to finally obtain the separator with a wide temperature range and a low shrinkage, and its specific performance parameters were tested as shown in Table 3:

TABLE 3

| Performance | Irradiation dose 100 kGy |
| --- | --- |
| Shrinkage (120° C.) | longitudinal: 0.7% |
| | transverse: 0.5% |
| pore closing temperature | 120° C. |
| film breaking temperature | 210° C. |
| High temperature strength (180° C.) | longitudinal: 15.1 MPa |
| | transverse: 11.2 MPa |

COMPARATIVE EXAMPLE 1

220 g of high density polyethylene having a density of 0.956 g/cm$^3$, 100 g of ultrahigh molecular weight polyethylene having a molecular weight of 5.0×10$^6$, and 6.4 g of n-octadecyl β-(3,5-di-tert-butyl-4-hydroxyphenyl)-propionate (antioxidant), 3.2 g of triallyl isocyanurate (crosslinking agent), and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, high density polyethylene, an antioxidant and a crosslinking agent were continuously dissolved in mineral oil in the twin-screw extruder at 180° C., and continuously extruded by a twin-screw extruder at a speed of 200 rpm. The mixture continuously entered into a slit die. The mixture was extruded through the slit die to a casting cooling roller, and cast into a strip at 80° C.

The obtained strip was placed in an extraction tank containing dichloromethane for extraction to remove mineral oil from the strip. The extracted strip was continuously fed into a biaxial stretching machine at 120° C. to be stretched into a film, then the resulting film material was subjected to a secondary extraction with dichloromethane, and the resulting film was washed with deionized water, heat set at 120° C. for 15 minutes, and wound at a speed of 20 m/min to obtain a non-irradiation-crosslinked battery separator, and its specific performance parameters were tested as shown in Table 4:

TABLE 4

| Performance | Irradiation dose 0 kGy |
| --- | --- |
| Shrinkage (120° C.) | longitudinal: 4.6% |
| | transverse: 3.7% |
| pore closing temperature | 120° C. |
| film breaking temperature | 180° C. |
| High temperature strength (180° C.) | longitudinal: 0.05 MPa |
| | transverse: 0.01 MPa |

COMPARATIVE EXAMPLE 2

220 g of high density polyethylene having a density of 0.956 g/cm$^3$, 100 g of ultrahigh molecular weight polyethylene having a molecular weight of 5.0×10$^6$, and 96 g of polyvinylidene fluoride having a molecular weight of 5.0×10$^5$ (melting point above 150° C.), 96 g of polyether ether ketone (the main chain containing a benzene ring and pendant vinyl group) having a melt index of 2.8-4.6 g/10 min, 6.4 g of n-octadecyl β-(3,5-di-tert-butyl-4-hydroxyphenyl)-propionate (antioxidant), 3.2 g of triallyl isocyanurate (crosslinking agent), and 2200 g of mineral oil were fed to a continuous mixing and charging kettle, and stirred at a speed of 50 rpm to mix the raw materials uniformly.

The mixture was continuously fed to a twin-screw extruder, and the ultrahigh molecular weight polyethylene, high density polyethylene, polyvinylidene fluoride, polyether ether ketone, an antioxidant and a crosslinking agent were continuously dissolved in mineral oil in the twin-screw extruder at 180° C., and continuously extruded by a twin-screw extruder at a speed of 200 rpm, the mixture continuously entered into a slit die, and was extruded through the slit die to a casting cooling roller, and cast into a strip at 80° C.

The obtained strip was placed in an extraction tank containing dichloromethane for extraction to remove mineral oil from the strip. The extracted strip was continuously fed into a biaxial stretching machine at 120° C. to be stretched into a film, then the resulting film material was subjected to a secondary extraction with dichloromethane, and the resulting film was washed with deionized water, heat set at 120° C. for 15 minutes, and wound at a speed of 20 m/min to obtain a non-irradiation-crosslinked battery separator, and its specific performance parameters were tested as shown in Table 5:

TABLE 5

| Performance | Irradiation dose 0 kGy |
| --- | --- |
| Shrinkage (120° C.) | longitudinal: 3.8% |
| | transverse: 3.0% |
| pore closing temperature | 125° C. |
| film breaking temperature | 180° C. |
| High temperature strength (180° C.) | longitudinal: 0.03 MPa |
| | transverse: 0.01 MPa |

The results show that by adding a fluoropolymer A with a melting point of above 150° C. and/or a polymer B having a benzene ring in its main chain to a conventional separator polymer composition and carrying out irradiation crosslinking during the preparation, the heat shrinkage was significantly improved, and the difference between the film breaking temperature and the pore closing temperature was well enlarged, and the resulting separator has a certain strength retention at high temperature, which greatly enhances the safety and reliability of the separator.

The above are only preferred examples of the invention and are not intended to limit the scope of the substantive technical content of the invention. The substantive technical content of the invention is broadly defined in the scope of the claims as attached. Any technical entity or method that is completed by others, if it is exactly the same as defined in the scope of the claims of the application, or an equivalent change, is considered to be within the scope of the claims.

The invention claimed is:

1. A separator for an electrochemical device, which comprises: an electron beam irradiation crosslinked fluoropolymer A with a melting point above 150° C. and/or a polymer B containing a benzene ring in its main chain; an ultrahigh molecular weight polyethylene having a molecular weight of $1.0×10^6$-$10.0×10^6$; a high density polyethylene having a density in the range of 0.940-0.976 g/cm$^3$; an antioxidant and a crosslinking agent wherein:

the fluoropolymer A with a melting point above 150° C. is selected from the group consisting of polytetrafluoroethylene, polyvinyl fluoride, polyvinylidene fluoride, ethylene-tetrafluoroethylene copolymer, propylene-tetrafluoroethylene copolymer, fluorinated ethylene-propylene copolymer, vinylidene fluoride-hexafluoropropylene copolymer, and vinylidene fluoride-tetrafluoroethylene-hexafluoropropylene terpolymer;

the polymer B having a benzene ring in its main chain is selected from the group consisting of: poly(paraphenylene terephthalamide), polyaryl ether sulfone, polyaryl sulfone, polyether sulfone, polyarylene sulfide sulfone, polyether ether ketone, polyether ketone, polyether ketone ketone, polyether ether ketone ketone, polyether ketone ether ketone ketone, polyphenylene ether, polyphenylene sulfide, polyaryl ester, polyphenyl ester, semi-aromatic or aromatic polyimides, semi-aromatic or aromatic polyamides, polyetherimides, and polyamideimides;

the antioxidant is selected from the group consisting of 4,4-thiobis(6-tert-butyl-m-cresol), dibutylhydroxytoluene, phosphite, tert-butylhydroquinone, n-octadecyl β-(3,5-di-tert-butyl-4-hydroxyphenyl)-propionate, 1,1,3-tris(2-methyl-4-hydroxy-5-tert-butylphenyl) butane, 2-tert-butyl-6-methylphenol, N,N'-bis(β-naphthyl)-p-phenylenediamine, dilauryl thiodipropionate, tris(nonylphenyl) phosphite, and triphenyl phosphite or comprises a combination of at least two of the foregoing;

the crosslinking agent is selected from the group consisting of mercaptobenzothiazole, benzothiazolyl disulfide, N-cyclohexylbenzothiazole sulfenamide, oxydivinylbenzothiazole sulfenamide, tetramethylthiuram monosulfide, tetramethylthiuram disulfide, zinc dimethyldithiocarbamate, zinc diethyldithiocarbamate, diphenylguanidine, di-o-tolylguanidine, ethylenethiourea, N,N'-diethyl thiourea, hexamethylenetetramine, zinc isopropyl xanthate, trimethylolpropane trimethacrylate, trimethylolpropane triacrylate, triallyl cyanurate, and triallyl isocyanurate or comprises a combination of at least two of the foregoing; and said separator has a temperature difference between pore closing temperature and film breaking temperature of 80-90° C., and a heat shrinkage of 2.0% or less.

2. A separator for an electrochemical device according to claim 1, wherein the content of the fluoropolymer A is 1-50 parts by weight, based on 100 parts of the total weight of the ultrahigh molecular weight polyethylene and the high density polyethylene.

3. A separator for electrochemical device according to claim 1, wherein the content of the polymer B is 1-50 parts by weight, based on 100 parts of the total weight of the ultrahigh molecular weight polyethylene and the high density polyethylene.

4. A separator for electrochemical device according to claim 1, wherein the weight ratio of the ultrahigh molecular weight polyethylene to the high density polyethylene is 1:1-1:20.

5. A method for preparing a separator for an electrochemical device, that comprises the steps of:

(1) mixing a fluoropolymer A with a melting point of above 150° C. and/or a polymer B having a benzene ring in its main chain, an ultrahigh molecular weight polyethylene having a molecular weight of $1.0×10^6$-$10.0×10^6$, and a high density polyethylene having a density of 0.940-0.976 g/cm$^3$, an antioxidant, a crosslinking agent and a pore-forming agent to form a mixture;

wherein the fluoropolymer A with a melting point of above 150° C. is selected from the group consisting of polytetrafluoroethylene, polyvinyl fluoride, polyvinylidene fluoride, ethylene-tetrafluoroethylene copolymer, propylene-tetrafluoroethylene copolymer, fluorinated ethylene-propylene copolymer, vinylidene fluoride-hexafluoropropylene copolymer and vinylidene fluoride-tetrafluoroethylene-hexafluoropropylene terpolymer; and the polymer B having a benzene ring in its main chain is selected from the group consisting of: poly(paraphenylene terephthalamide), polyaryl ether sulfone, polyaryl sulfone, polyether sulfone, polyarylene sulfide sulfone, polyether ether ketone, polyether ketone, polyether ketone ketone, polyether ether ketone ketone, polyether ketone ether ketone ketone, polyphenylene ether, polyphenylene sulfide, polyaryl ester, polyphenyl ester, semi-aromatic or aromatic polyimides, semi-aromatic or aromatic polyamides, polyetherimides and polyamideimides;

the antioxidant is selected from the group consisting of 4,4-thiobis(6-tert-butyl-m-cresol), dibutylhydroxytoluene, phosphite, tert-butylhydroquinone, n-octadecyl β-(3,5-di-tert-butyl-4-hydroxyphenyl)-propionate, 1,1,3-tris(2-methyl-4-hydroxy-5-tert-butylphenyl) butane, 2-tert-butyl-6-methylphenol, N,N'-bis(β-naphthyl)-p-phenylenediamine, dilauryl thiodipropionate, tris(nonylphenyl) phosphite, and triphenyl phosphite or comprises a combination of two or more of the foregoing; and the crosslinking agent is selected from the group consisting of mercaptobenzothiazole, benzothiazolyl disulfide, N-cyclohexylbenzothiazole sulfenamide, oxydivinylbenzothiazole sulfenamide, tetramethylthiuram monosulfide, tetramethylthiuram disulfide, zinc dimethyldithiocarbamate, zinc diethyldithiocarbamate, diphenylguanidine, di-o-tolylguanidine, ethylenethiourea, N,N'-diethyl thiourea, hexamethylenetetramine, zinc isopropyl xanthate, trimethylolpropane trimethacrylate, trimethylolpropane triacrylate, triallyl cyanurate, and triallyl isocyanurate or comprises a combination of two or more of the foregoing;

(2) extruding the mixture into a strip by an extruder;
(3) extracting the strip with an organic solvent;
(4) stretching the extracted strip into a film by a stretching machine; and
(5) electron beam irradiation crosslinking the film to obtain the separator for electrochemical device having a temperature difference between pore closing temperature and film breaking temperature of 80-90° C., and a heat shrinkage of 2.0% or less.

6. The preparation method according to claim 5, wherein the content of the fluoropolymer A is 1-50 parts by weight, based on 100 parts of the total weight of the ultrahigh molecular weight polyethylene and the high density polyethylene.

7. The preparation method according to claim 5, wherein the content of the polymer B is 1-50 parts by weight, based on 100 parts of the total weight of the ultrahigh molecular weight polyethylene and the high density polyethylene.

8. The preparation method according to claim 5, wherein the weight ratio of the ultrahigh molecular weight polyethylene to the high density polyethylene is 1:1-1:20.

9. The preparation method according to claim 5, wherein the electron beam irradiation crosslinking is carried out using an irradiation dose in the range of 10 to 500 kGy.

10. A separator for electrochemical device, wherein the separator for electrochemical device is prepared by the method according to claim 5.

11. An electrochemical device comprising a positive electrode, a negative electrode, a separator between the positive electrode and the negative electrode, and an electrolyte, wherein the separator is in accordance with claim 1.

\* \* \* \* \*